United States Patent
Boyd et al.

(10) Patent No.: US 6,175,479 B1
(45) Date of Patent: Jan. 16, 2001

(54) INSTANTANEOUS PROTECTION DEVICE AND METHOD FOR A CIRCUIT BREAKER

(75) Inventors: Donald R. Boyd, Sanford; David Michael Cooper, Raleigh, both of NC (US)

(73) Assignee: Siemens Energy & Automation, Inc., Alpharetta, GA (US)

(*) Notice: Under 35 U.S.C. 154(b), the term of this patent shall be extended for 0 days.

(21) Appl. No.: 09/292,692

(22) Filed: Apr. 15, 1999

Related U.S. Application Data
(60) Provisional application No. 60/082,845, filed on Apr. 23, 1998.

(51) Int. Cl.[7] ..................................................... H02H 3/00
(52) U.S. Cl. .................................................. 361/96; 361/97
(58) Field of Search ............................... 361/96, 97, 93.1, 361/93.2, 93.6, 42

(56) References Cited

U.S. PATENT DOCUMENTS

| | | | |
|---|---|---|---|
| 4,814,935 | * 3/1989 | Arinobu et al. | 361/96 |
| 4,858,058 | * 8/1989 | Ishii | 361/96 |
| 5,627,716 | * 5/1997 | Lagree et al. | 361/93 |

* cited by examiner

*Primary Examiner*—Michael J. Sherry
(74) *Attorney, Agent, or Firm*—J. Marc Asperas

(57) ABSTRACT

The present invention involves a power circuit breaker that conditionally and temporarily enables instantaneous trip protection. A position sensor senses whether the breaker contacts are open or closed. When the breaker contacts are open, the circuit breaker enables the instantaneous trip protection. After the circuit breaker contacts are closed, the circuit breaker continues to enable the instantaneous trip protector for a predetermined period of time. After this time delay, the circuit breaker disables the instantaneous trip protection and the circuit breaker reverts to providing its ordinary protection, such as long-time or short-time protection.

16 Claims, 5 Drawing Sheets

INSTANTANEOUS PROTECTION DEVICE AND METHOD FOR A CIRCUIT BREAKER

This application claims the benefit of U.S. Provisional No. 60/082,845 filed Apr. 23, 1998.

FIELD OF INVENTION

This invention relates to power circuit breakers, and, more particularly, to a circuit breaker that conditionally and temporarily enables instantaneous trip protection.

BACKGROUND

Circuit breakers are typically used throughout distribution systems, for example, at multiple locations between the source of power and a load. The circuit breakers monitor one or more of the distribution lines, and when a fault occurs (such as a current overload or a ground fault), one of the circuit breakers trips thus interrupting the fault and removing it from the rest of the distribution system.

However, when a circuit breaker trips, it may interrupt or close down several distribution lines in addition to the line with the fault. Consequently, it is desirable to isolate the fault and interrupt the system as close to the fault as possible. This way, more of the distribution system remains operational.

It is known in the art, in an attempt to isolate the fault, that it is desirable to place circuit breakers with different trip characteristics at strategic points in the distribution system. For example, it is known to use circuit breakers with at least one or more of the following trip characteristics: long-time delay tripping, short-time delay tripping, and instantaneous tripping. Long-time delay tripping applies when an overload current is slightly larger than the current rating of the circuit breaker. In these cases, the circuit breaker trips pursuant to the known $I^2=K$ relationship. The exact delay time for long-time tripping varies depending on the amount of overload current, but is typically about 3.5 to 30 seconds when the overload is about at the calibration point of the breaker (which is usually about six times the circuit breaker's current transformer rating).

Short-time tripping applies when the overload current is substantially higher than the current rating of the breaker. If the overload current goes above a predetermined amount, and the current does not fall back below this amount within a predetermined period of time, the circuit breaker trips. Short time tripping delays are usually between 80 to 400 milliseconds.

Instantaneous tripping applies when the overload current reaches a value approaching that which can cause catastrophic damage to the breaker or other equipment. When the overload current reaches this predetermined value, the circuit breaker trips without any intentional delay, which is usually around three line cycles due to unavoidable mechanical delays.

By placing circuit breakers with faster tripping characteristics closer to the loads, faults can be better isolated. Consequently, it is known to coordinate circuit breakers throughout a distribution system by placing circuit breakers with faster-time protection characteristics near loads, circuit breakers with longer-time protection characteristics farther from the loads, and circuit breakers with intermediate-time protection characteristics at intermediate locations. Therefore, the circuit breakers that are closer to the loads are given the opportunity to clear the fault before a circuit breaker trips that is father from the load.

More particularly, in a distribution system, most circuit breakers, regardless of location in the system, employ long-time trip characteristics. Circuit breakers closest to the load usually have instantaneous-time trip characteristics as well. Circuit breakers near the service entrance might be configured with instantaneous or short-time trip characteristics, while circuit breakers near intermediate feeders may also have short-time trip characteristics. This coordinated system allows the circuit breaker closest to fault to trip first, which maintains power to as much of the system as possible.

Consequently, it is desirable that certain breakers do not employ instantaneous tripping. Otherwise, they could trip before the circuit breakers that are closer to the fault, which may disrupt more of the system than is necessary. On the other hand, there are certain instances when the lack of instantaneous protection may cause damage to a breaker, such as when a breaker is closed into a fault. As is well known in the art, open breakers that are closed into faults are particularly susceptible to damage in a short period of time. In other words, a circuit breaker can generally withstand a higher fault current when it is latched closed than when the breaker is closed into the fault.

In some instances, a breaker may open pursuant to its short or long-time tripping characteristics, and then be re-closed before the fault was repaired or removed. If such a breaker only has long-time or short-time tripping characteristics, it may not react quickly enough to prevent damage to the breaker when it is re-closed into the fault. Therefore, it is desirable that such circuit breakers react quickly or instantaneously when closed into faults, while reacting pursuant to normal short or long-time trip characteristics under normal conditions.

In an attempt to prevent damage to circuit breakers while maintaining power to as much of a distribution system as possible, some known devices use a series of interconnected circuit breakers that communicate with one another. Each circuit breaker in the system is equipped with instantaneous tripping characteristics. When one breaker trips, it then notifies the other breakers that it has tripped, thereby temporarily overriding the instantaneous trip characteristics of those breakers. After a time delay elapses, those circuit breakers re-implement their normal instantaneous trip characteristics.

This known system, however, is costly and complex, and it does not necessarily prevent a tripped circuit breaker from being closed into a fault. For example, if one circuit breaker trips in this system, it overrides the instantaneous trip characteristics of the other circuit breakers for a period of time. If a second circuit breaker had tripped concurrently, or trips in the interim pursuant to its short or long-term characteristics, it could be closed into a fault and damaged because its instantaneous trip characteristic was temporarily overridden. Moreover, since each breaker is equipped with instantaneous trip characteristics, there is an increased risk that any of these breakers could trip during a fault before the breaker closest to fault trips. This would interrupt power to more of the system than is necessary.

Therefore, it is desirable to provide an inexpensive and reliable circuit breaker that provides short and/or long time protection characteristics on a full time basis, that will trip instantaneously when closed into a fault, and that does not employ instantaneous trip protection on a full time basis.

SUMMARY

The present invention involves an apparatus and method for power circuit breakers that conditionally and temporarily enable instantaneous trip protection. More particularly, the present invention is directed to power circuit breakers, including, for example, low voltage power circuit breakers, insulated case circuit breakers, molded case circuit breakers, and the like, that ordinarily do not have instantaneous trip protection. These breakers are equipped with a control circuit that enables and disables conventional instantaneous protection on a conditional and temporary basis.

Preferably, the circuit breakers are equipped with a position sensor that senses whether the breaker contacts are open or closed. The control circuit is coupled to the position sensor and to conventional instantaneous trip protection circuitry. When the breaker is open, the control circuit enables the instantaneous protection circuitry. After the circuit breaker is closed, the control circuit continues to enable the instantaneous protection circuit for a predetermined period of time. After this time delay, the control circuit disables the instantaneous trip protection and the circuit breaker reverts to providing only its ordinary protection, such as long-time and/or short-time protection.

Consequently, if the circuit breaker is open and is then closed into a fault, the enabled instantaneous trip protection circuit will cause the breaker to quickly re-open. This prevents damage to the breaker when closed into faults, and allows the breaker to survive at a higher frame current rating. Otherwise, if there is no fault upon the close, the control circuit disables the instantaneous trip protection circuit after a predetermined period of time, and the circuit breaker automatically reverts to its ordinary full-time protection, such as long and/or short-time protection.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DESCRIPTION

Figure 1:
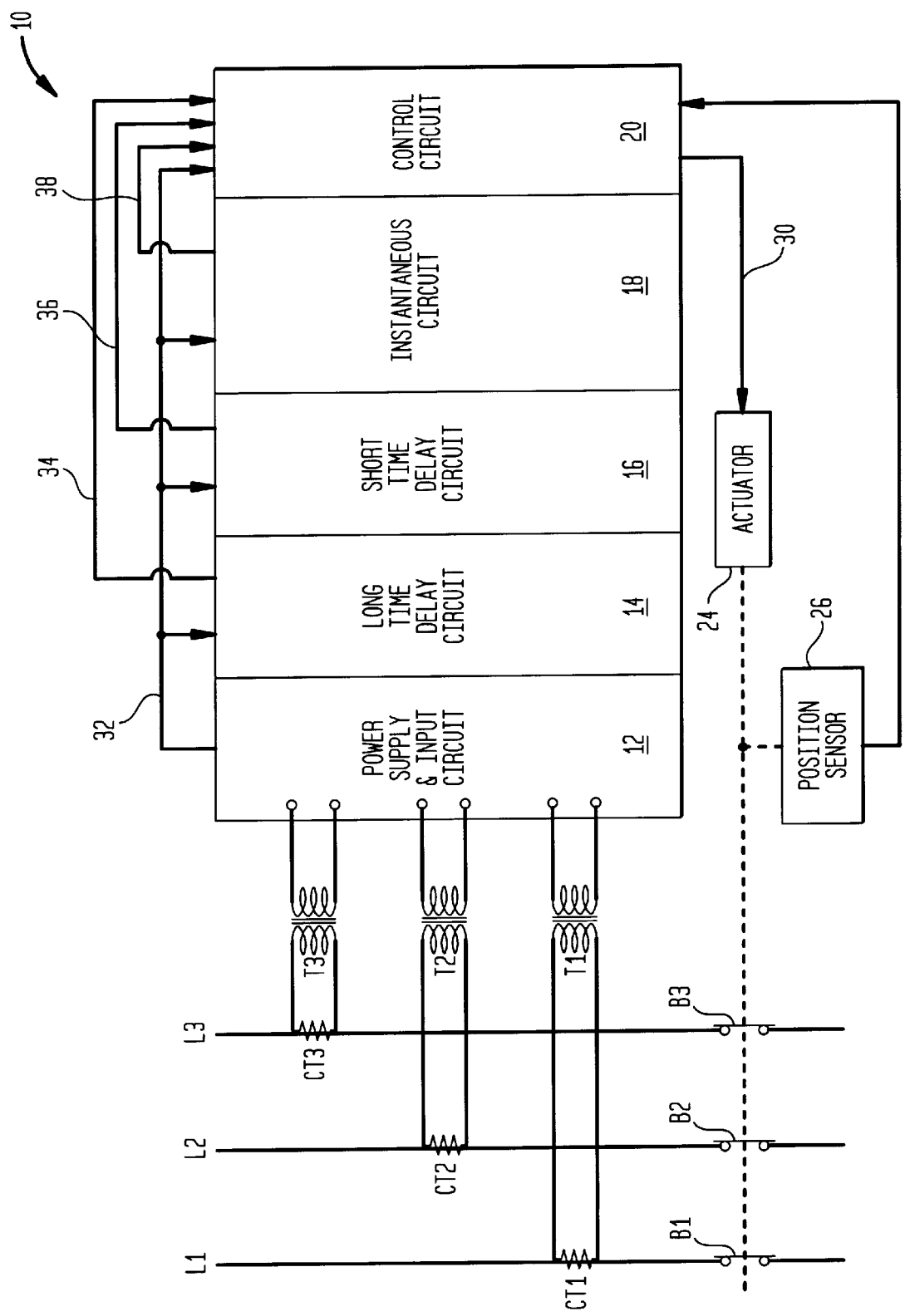
FIG. 1 shows a circuit breaker, partially in schematic form and partially in block diagram form.

Referring to FIG. 1, an exemplary circuit breaker 10 is shown. As will be apparent from the discussion below, the components of the circuit breaker 10 are all preferably standard components, except for the control circuit 20, which conditionally enables and disables the instantaneous trip circuit 18. The circuit breaker 10 is shown coupled to an exemplary three-phase distribution line, shown as lines L1, L2 and L3. For purposes of this description, it is assumed that the distribution line is a three phase 60 hertz AC line. As persons skilled in the art will appreciate, the described distribution line is for exemplary purposes, and circuit breaker 10 can be coupled to any suitable distribution line or lines, with or without a neutral.

The circuit breaker 10 opens to disconnect and closes to complete the current paths of lines L1, L2 and L3. This is accomplished by moving contacts B1, B2 and B3. More particularly, when the circuit breaker 10 determines that the current paths L1, L2 and L3 should be opened, it signals actuator 24, which moves contacts B1, B2 and B3 from the closed position (as shown in FIG. 1) to an open position (not shown). When the contacts B1, B2 and B3 are open, the current path of each line L1, L2 and L3 is interrupted.

As explained further below, a circuit breaker position sensing switch 26 monitors the position of the contacts B1, B2 and B3 and provides a signal indicative of this position to circuit breaker 10, or, more specifically, to control circuit 20. Position sensing switch 26 is preferably an electromechanical switch. Circuit breaker position sensing switches of this type are well known in the art. For example, switch 26 can be an electromechanical switch mechanically coupled to the circuit breaker such that switch 26 opens when the contacts are substantially open and closes when the contacts are substantially closed. Of course, any type of sensor or indicating device can be used provided that it indicates, or issues a signal indicating, whether the circuit breaker is open or closed.

As is known in the art, current transformers CT1, CT2 and CT3 each produce a signal representative of the current in their respective line, i.e., L1, L2 and L3. The current transformers CT1, CT2 and CT3 are coupled to transformers T1, T2 and T3, respectively, which step-down the magnitude of the current for input to circuit breaker 10. Thus, transformers T1, T2 and T3 provide the breaker 10 with signals representative of the current in each line L1, L2 and L3.

A power supply and input circuit 12 is coupled to transformers T1, T2 and T3. In this example, and as known in the art, the circuit breaker 10 receives its power from the distribution lines L1, L2 and L3. Of course, as is also known in the art, the circuit breaker 10 can optionally have an independent power supply or a back-up power supply when power to lines L1, L2 and L3 is cut (not shown).

Input circuit 12 receives the line current signals from transformers T1, T2 and T3. As is known in the art, the circuit processes these signals and provides an output signal on line 32 representative of the highest current in any of the three lines L1, L2 or L3. Protective circuits 14, 16 and 18 use the current-indicating signal on line 32 to determine whether there is an overload condition on any line L1, L2 or L3. Preferably, circuit breaker 10 reacts to the highest current that flows in any line. If any line is overloaded, as described in more detail below, the circuit breaker 10 opens the contacts B1, B2 and B3 to stop the current flow in lines L1, L2 and L3, thereby removing the overload condition from the lines and any related equipment.

Protection circuit 14 is a long-time delay circuit. Such circuits are well known in the art. It reacts to the current signal from the input circuit 12. If the current value exceeds a predetermined value for a predetermined amount of time, protection circuit 14 issues a signal to actuator 24 which opens the contacts B1, B2 and B3. As explained below, protection circuit 14 signals the actuator 24 via line 34 and control circuit 20. Long-time delay tripping applies when an overload current is slightly larger than the current rating of the circuit breaker 10. In these cases, the circuit breaker 10 opens pursuant to the known $I^2 t = K$ relationship. The exact delay time for long-time tripping varies depending on the amount of overload current, but is typically about 3.5 to 30 seconds when the overload is about at the calibration point of the breaker 10 (which is usually about six times the circuit breaker's current transformer rating).

Protection circuit 16 is a short-time delay circuit. Such circuits are well known in the art. Short-time tripping applies when the overload current indicated by line 32 is substantially higher than the current rating of the breaker 10. If the overload current goes above a predetermined amount, and the current does not fall back below this amount within a predetermined period of time, the circuit breaker 10 trips or opens. Short-time tripping delays are usually between 80 and 400 milliseconds. As explained in more detail below, if short-time circuit 16 detects an appropriate overload condition, it issues a signal to actuator 24 via line 36 and control circuit 20, which opens the contacts B1, B2 and B3.

Protection circuit 18 is an instantaneous circuit. Instantaneous circuit 18 monitors current input to the circuit breaker 10 via line 32 and determines whether the current has surpassed a predetermined value such that the circuit breaker should be instantaneously tripped. Such instantaneous circuits are well known in the art. Instantaneous tripping applies when the overload current indicated by line 32 reaches a value approaching that which can cause catastrophic damage to the breaker 10 or other equipment. Instantaneous trip circuits, for example, are typically configured to provide a trip threshold between 15.0 times and 17.0 times above the rated current across system component tolerances. When the instantaneous circuit detects an overload current that reaches this predetermined value, it causes the circuit breaker 10 to open without any intentional delay, usually resulting in approximately only three line cycles due to unavoidable mechanical delays.

As explained further below, control circuit 20 conditionally and temporarily enables and disables instantaneous circuit 18. When the instantaneous circuit 18 is enabled, it monitors the line current via line 32 for overload conditions. If an overload is detected, it issues a signal to actuator 24 via line 30 and control circuit 20, which opens the contacts B1, B2 and B3. On the other hand, if control circuit 20 determines that instantaneous circuit 18 should be disabled, instantaneous circuit 18 cannot cause the breaker 10 to open, even if the line current were overloaded such that it would otherwise cause instantaneous circuit 18 to open the breaker 10.

Thus, control circuit 20 is coupled to long time delay circuit 14, short time delay circuit 16, and instantaneous circuit 18 via lines 34, 36 and 38. It receives trip signals from protection circuits 14, 16 and 18 via lines 34, 36 and 38 indicating that the circuit breaker 10 should be tripped or opened.

Figure 2:
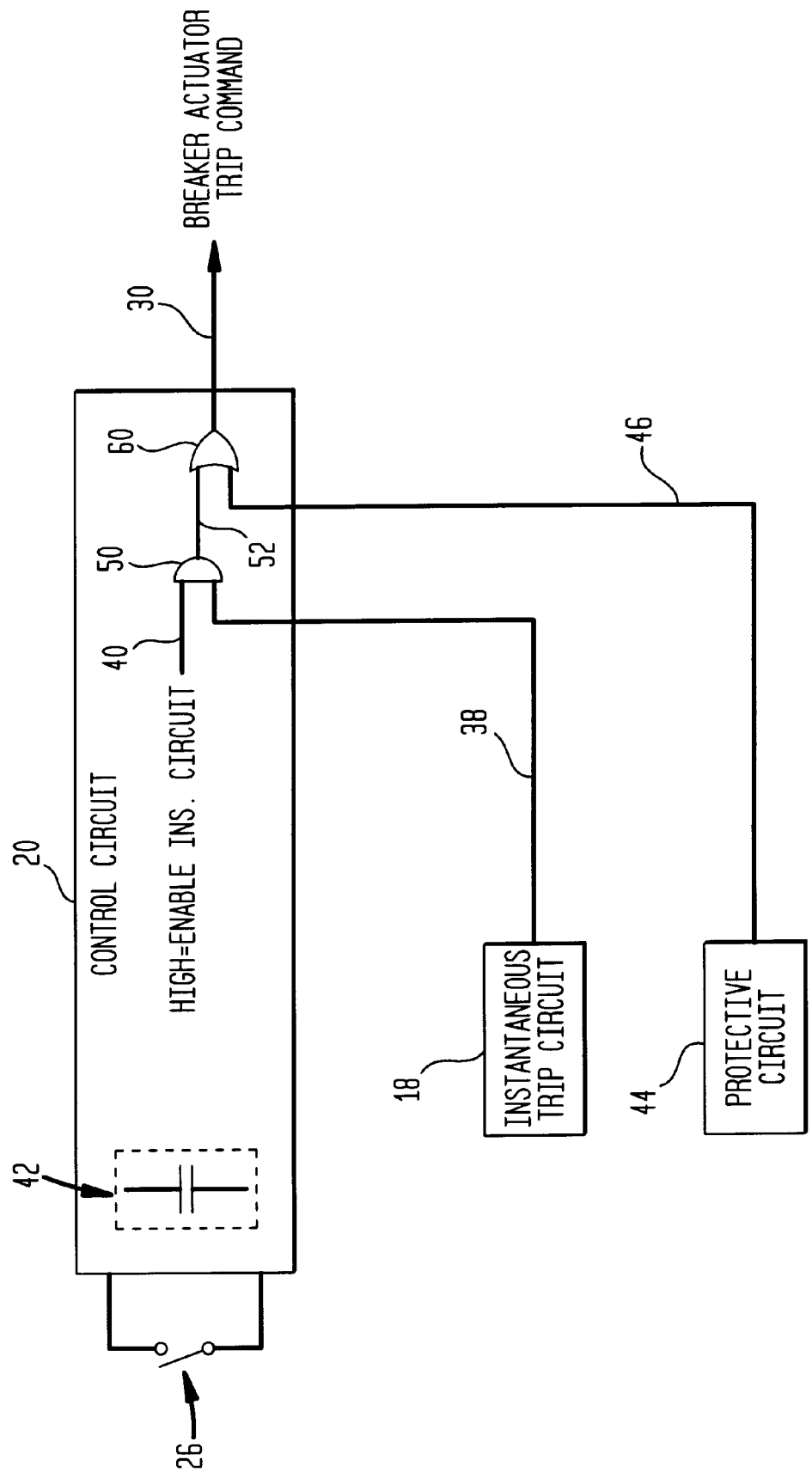
FIG. 2 shows, partially in schematic form and partially in block diagram form, the instantaneous trip circuit and control circuit of FIG. 1 in combination with another protective circuit.
Figure 3:
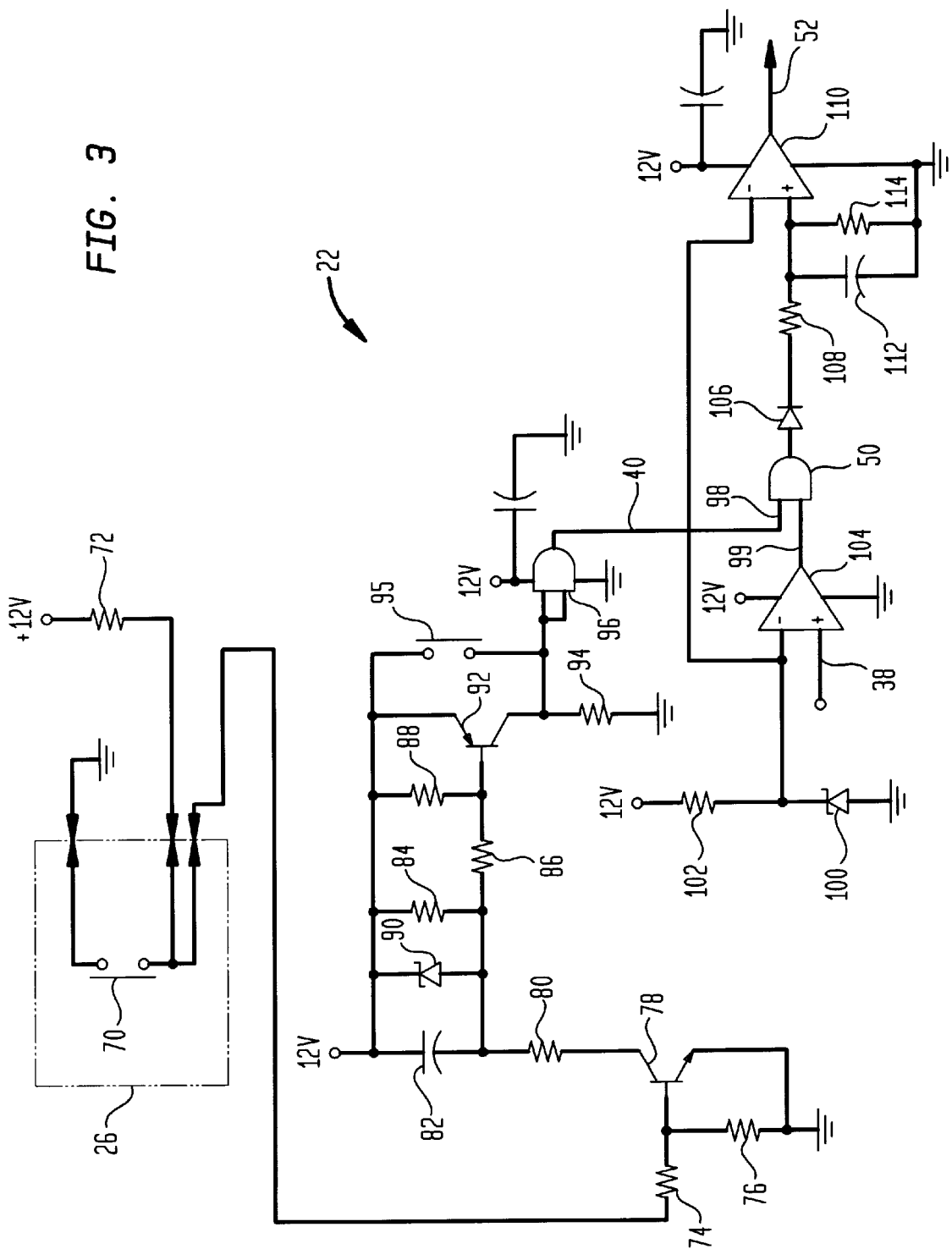
FIG. 3 is a schematic diagram of the control circuit of FIG. 2.

With reference now to FIGS. 2 and 3, and as described in more detail below, control circuit 20 samples the position of circuit breaker position sensing switch 26 to determine whether the circuit breaker is open or closed, and then stores the result of this sample in memory 42. If the control circuit 20 determines that the circuit breaker 10 is open, it issues a signal (e.g. high) on line 40 indicating that instantaneous circuit 18 should be enabled.

Protective circuit 44 is indicative of a circuit breaker's protective device other than instantaneous protection, such as long time delay, short time delay, ground fault, or the like. With reference to the exemplary circuit breaker 10 of FIG. 1, protective device 44 could be either long time delay circuit 14 or short time delay circuit 16, or both. As persons skilled in the art will appreciate, the present invention adds instantaneous protection to a circuit breaker on a conditional and temporary basis, in addition to other types of protective devices the circuit breaker may employ.

When protective circuit 44 detects an appropriate overload condition, it issues an overload trip signal via line 46 to control circuit 20. Again, with reference to the exemplary circuit breaker 10 of FIG. 1, if protective circuit 44 is a long-time delay circuit like circuit 14, line 46 would be the same as line 34 of FIG. 1. Alternatively, if protective circuit 44 is a short-time delay circuit like circuit 16 of FIG. 1, line 46 would be the same as line 36 of FIG. 1.

As shown in FIG. 2, line 40 of control circuit 20 is coupled to a logic AND gate 50 along with the output 38 of the instantaneous circuit 18. Thus, if the control circuit 20 issues a signal on line 40 indicating that instantaneous circuit 18 should be enabled, and instantaneous circuit 18 determines that an overload condition exists and issues a trip signal on its output 38, the AND gate 50 issues a logic high signal on its output line 52. Output 52 of AND gate 50 is coupled to an OR gate 60 along with the output 46 of protective circuit 44. Consequently, if output signal 52 from AND gate 50 is high (which indicates that the control circuit 20 has enabled instantaneous trip protection and that instantaneous trip circuit 18 has determined that an instantaneous trip condition exists), or output signal 46 from the protective circuit 44 is high (which indicates that an ordinary overload condition exists, such as a long or short-time overload condition), then a high signal is issued on line 30. As shown in FIG. 1, this, in turn, causes actuator 24 to open the circuit breaker by moving contacts B1, B2 and B3 to the open position.

In other words, under appropriate overload conditions, the ordinary protective devices indicated by protective circuit 44 can cause the circuit breaker to open independently of instantaneous trip circuit 18. Accordingly, protective circuit or circuits 44 provide full time protection for the circuit breaker. On the other hand, the instantaneous trip circuit 18 can cause the circuit breaker to open only if control circuit 20 enables it. Thus, control circuit 20 controls the enablement and disablement of the instantaneous trip protection characteristics of breaker 10, while the protective circuit 44 provides ordinary, full-time protection, such as long-time and/or short-time delay protection.

As described in more detail below, control circuit 20 includes a memory 42, which is preferably a capacitor. When the sensing switch 26 is open, which is indicative of open contacts B1, B2 and B3, this position is stored in memory 42 for use by the control circuit 20. As explained below, this allows the control circuit 20 to continue to enable the instantaneous circuit 18 for a predetermined time period after the circuit breaker is closed. Thus, when the circuit breaker is moved from the open position to the closed position (or, in other words, the contacts B1, B2 and B3 are moved from the open position to the closed position), control circuit 20 continues to enable instantaneous trip protection for a period of time after the breaker has been closed. This provides temporary instantaneous trip protection, for example, when the breaker is closed into a fault.

Referring to FIG. 3, a schematic diagram of the preferred embodiment of the control circuit 20 and sensing switch 26 is shown. Sensing switch 26 comprises a mechanical switch 70 that opens and closes with the circuit breaker. As explained in more detail below, when the circuit breaker is open, switch 70 is open, and when the circuit breaker is closed, switch 70 is closed.

When the switch 70 is open, a voltage is established at the base of npn transistor 78 via the current that flows from the twelve volt power supply, resistors 72, 74 and 76, to ground. This biases transistor 78 on, which completes a current path between the resistor 80 and ground. Current can therefore flow through resistor 80 and transistor 78 via the power supply, resistors 84, 86 and 88, and ground. This establishes a voltage drop across resistor 88, which biases pnp transistor 92 on, which, in turn, completes a current path from the voltage source, through the collector and emitter of transistor 92, through resistor 94 to ground. This establishes a high signal at the input of buffer 96, which passes a logic high output on line 40 to the input 98 of AND gate 50 (which corresponds to AND gate 50 in FIG. 2). The output of buffer 96 corresponds to line 40 of Figure. 2, which, when high, indicates that the control circuit 20 has enabled instantaneous trip protection.

The output 38 of instantaneous circuit 18 is input as the positive input of comparator 104. A voltage signal is established at the negative input of comparator 104 by Zener diode 100, which is tied to the twelve volt power source via resistor 102. Consequently, when the instantaneous circuit 18 issues a high signal on its output 38, the comparator 104 outputs a high signal to the input 99 of AND gate 50. AND gate 50 issues a high signal when switch 70 is open (which causes input 98 of AND gate 50 to be high), and when instantaneous circuit 18 issues a high signal on its output 38 (which indicates that an overload condition exists warranting instantaneous tripping of the circuit breaker).

The output of AND gate 50 is coupled to a diode 106 which is coupled to resistor 108. Resistor 108 is coupled to the positive input of comparator 110 and also to capacitor 112 and resistor 114. A voltage signal is established at the negative input of comparator 110 via Zener diode 100. Consequently, when the output of AND gate 50 is high, comparitor 110 outputs a high signal on line 52, which, in turn, is passed by OR gate 60. As shown in FIGS. 1 and 2, this will send a command to the breaker actuator 24 which causes the circuit breaker to open.

On the other hand, if the circuit breaker has been closed for a period of time, which means switch 70 is closed, no current will flow through resistors 74 or 76. Transistor 78 will not be biased on, and current will not flow through resistor 80. Therefore, transistor 92 will be off. A low signal is established at the inputs of buffer 96 via resistor 94 and ground. Consequently, the logic output 40 of buffer 96 is low, which causes the output of AND gate 50 to be low regardless of the signal on input 99. This disables instantaneous trip protection.

An RC circuit consisting of capacitor 82 and resistors 84, 86 and 88 performs a memory function so that, when the circuit breaker is moved from an open to closed position, the control circuit 20 continues to issue a high signal on line 40 for a period of time. This ensures that instantaneous trip protection remains enabled for a period of time after the circuit breaker is moved from the open position to the closed position.

More particularly, when the circuit breaker is open, transistor 78 is on, and a voltage drop is established across the capacitor 82. Zener diode 90 clamps this voltage drop to a predetermined amount. When the circuit breaker is thereafter closed, transistor 78 turns off, but a charge, which is predetermined by the Zener diode clamp 90, remains on capacitor 82. This charge maintains a voltage drop across the capacitor, which, in turn, maintains a voltage drop across resistor 88, which, in turn, keeps transistor 92 biased on. As described above, this causes a logic high signal on line 40 which indicates that the control circuit 20 is enabling instantaneous trip protection. However, the charge on capacitor 82 decays through resistors 84, 86 and 88. Eventually, the voltage drop across capacitor 82 decreases to the point where transistor 92 is no longer biased on, which disables instantaneous protection. Consequently, the control circuit 20 enables instantaneous protection for a period of time after the circuit breaker has been moved from the open position to the closed position.

Capacitor 82 also performs a memory function during power-up conditions. More particularly, many circuit breaker trip units derive their power from the same line current that is monitored for overcurrent conditions. Consequently, when the circuit breakers trip or open, the power to the trip unit is cut off. This means that the twelve volt power to control circuit 20 may also be cut off when the circuit breaker opens. Capacitor 82, however, ensures that the control circuit 20 enables instantaneous trip protection when the circuit breaker is moved from an open or power-off position to a closed or power-on position.

Specifically, if the circuit breaker is configured such that the twelve volt power supply to the control circuit 20 is cut off when the circuit breaker is tripped, the enable/disable line 40 of circuit 20 becomes undefined. At this point, the circuit breaker is open and subject to being closed into a fault. Also, at this point, transistor 78 is off and capacitor 82 is discharged.

As is well understood in the art, as a circuit breaker is moved between the open and closed positions, an arc occurs between the breaker's main contacts. This means that, as the breaker is moved from the open position towards the closed position, current begins to flow through the breaker and the breaker begins to power-up.

Figure 4:
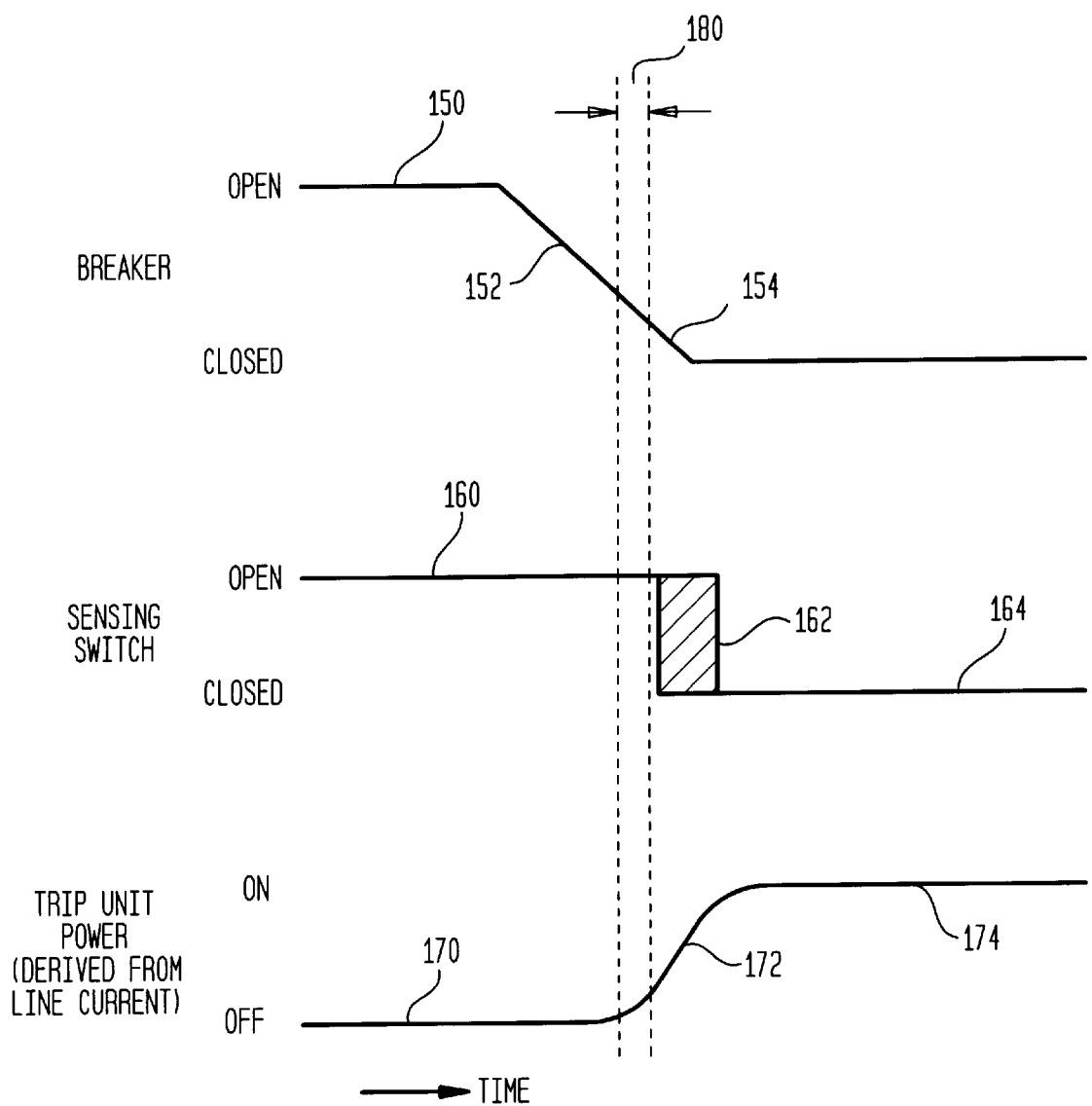
FIG. 4 is a graphical diagram showing the timing relationships between circuit breaker position, sensor switch position, and trip unit power.

FIG. 4 illustrates this power-up condition for circuit breakers that cut off power to their trip units when open. The circuit breaker is in the open position 150. It then begins its transition towards the closed position, as shown by reference numeral 152. The circuit breaker is closed at 154. Meanwhile, sensing switch 70 also begins in the open position 160. When the circuit breaker is approximately closed at 154, the sensing switch also closes, as shown at 164. However, as understood in the art, there is a short, undefined period during which the sensing switch 70 is an undefined area 162 because of switch bounce. Therefore, the sensing switch 70 may close slightly before or slightly after the circuit breaker contacts actually close at 154.

At the same time, the trip unit power is off at 170 because the circuit breaker is open. As the circuit breaker approaches the closed position at 154, trip unit power increases from 0 volts to about the full 12 volts. This power begins prior to the closed position at 154 because of arcing at the circuit breaker's main contacts. This power-up transition is shown generally by reference numeral 172. When the circuit breaker is closed at 154, the trip unit is at full power, as shown generally by 174.

As explained above, in order to enable instantaneous protection, the control circuit 20 first determines whether the circuit breaker was open. The control circuit 20, however, may not receive full power until the circuit breaker is in the closed position. In situations where the circuit breaker is open and has cut off power to the trip unit, the control circuit 20 must determine whether the circuit breaker was open or closed before the circuit breaker is fully closed, and thus before the control circuit 20 receives full power. The preferred control circuit 20 achieves this by determining and storing the position of the sensing switch 70 during the time interval generally indicated by 180.

Specifically, as the current begins to flow in the trip unit, the trip unit's supply voltage will quickly reach 3 to 4 volts, which typically occurs within the first few milliseconds after the main contact arcing begins. This supply voltage is more than enough to forward bias transistor 78, which causes capacitor 82 to charge. Zener diode 90 clamps the voltage drop across this capacitor to preferably around 3.9 volts. Thus, capacitor 82 becomes fully charged within a very short period of time. Meanwhile, transistor 92 is quickly biased on, which enables instantaneous trip protection. All of this preferably occurs before the circuit breaker has closed at 154.

When the circuit breaker is closed, it causes switch 70 to close which, in turn, causes transistor 78 to turn off. The charge on capacitor 82, however, continues to forward bias transistor 92, which continues to enable instantaneous trip protection. Therefore, the control circuit 20 continues to enable instantaneous trip protection after the circuit breaker has closed. The charge on capacitor 82 discharges through resistors 84, 86 and 88, and, eventually, transistor 92 is turned off, which disables instantaneous trip protection. Preferably, the time constant of this RC circuit is adjusted so that capacitor 82 biases transistor 92 on for about 45 milliseconds. Instantaneous trip protection will therefore be enabled as the circuit breaker is closed at 154, and for a period of time approximately 45 milliseconds thereafter.

This time delay is also important because the circuit breaker's trip actuator 24 may not trigger until is receives full power. Therefore, the control circuit 20 should maintain its enabled condition until the trip actuator is powered up and functional. A delay of the preferred 45 milliseconds is typically more than sufficient in this regard.

Consequently, if a circuit breaker equipped with control circuit 20 is being closed into a fault, the control circuit 20 enables instantaneous trip protection prior to the circuit breaker closing, and for a period of time thereafter. This allows the instantaneous trip circuit 18 to detect the overload condition and issue a signal that causes actuator 24 to trip or open the circuit breaker, which prevents damage to the breaker. Otherwise, if there is no fault upon the close, instantaneous trip protection is automatically disabled in about 45 milliseconds. The circuit breaker thereafter reverts to having its normal long and/or short-time protection characteristics. This temporary and conditional instantaneous re-opening of the breaker may prevent damage to the breaker and associated equipment, and allows the breaker to survive at a higher short circuit rating.

Figure 5:
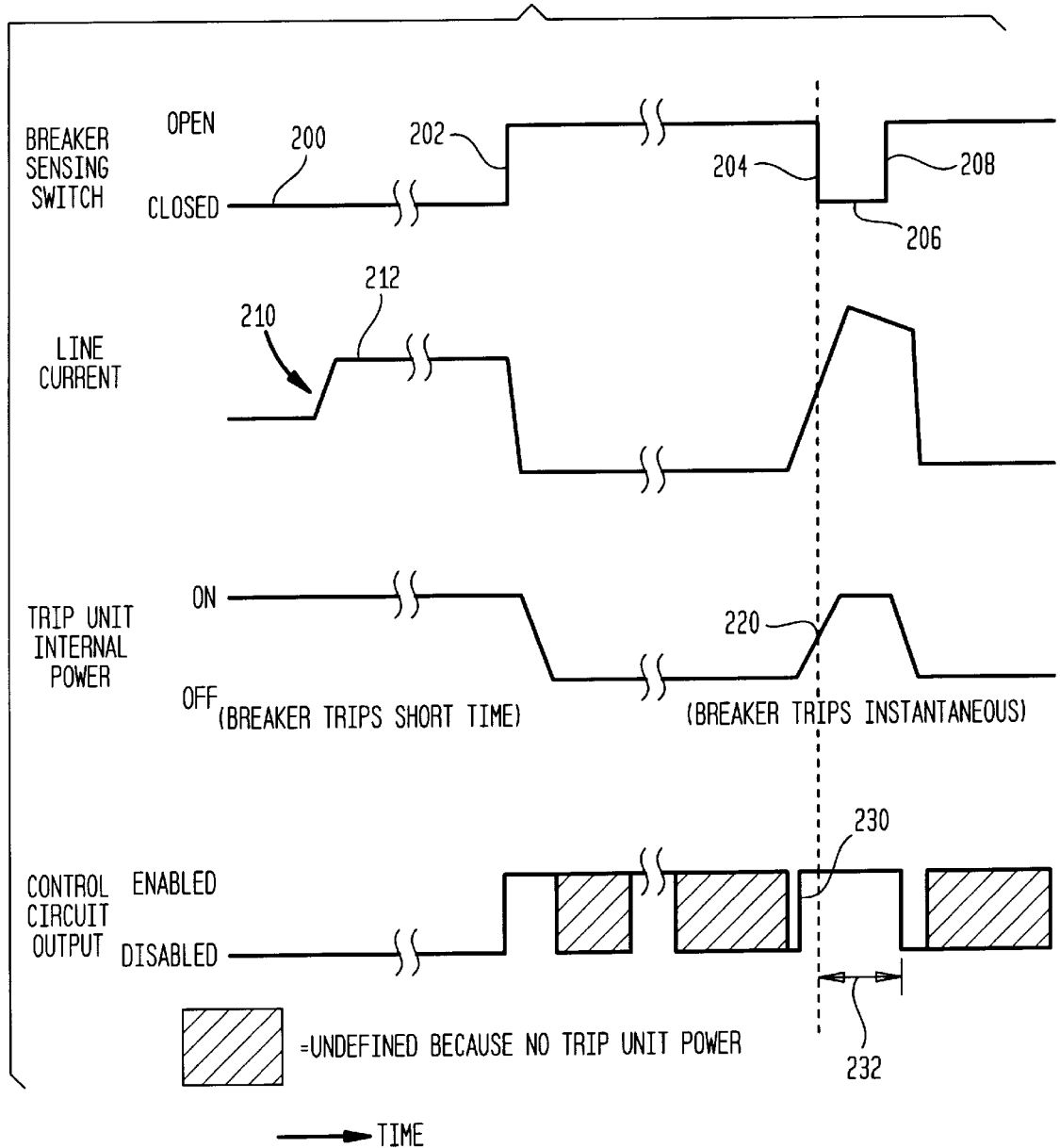
FIG. 5 is a graphical diagram showing the timing relationships between sensor switch position, line current, trip unit power and control circuit output.

FIG. 5 illustrates one aspect of the timing and implementation of this conditional and temporary instantaneous protection. Initially, the breaker is in closed position, which means that the sensing switch 70 is in a closed position, as shown by 200. A fault occurs at 210 and current increases to an overload level 212. The circuit breaker then trips open pursuant to, for example, its normal short-time delay protection circuitry. This opens the sensing switch 70, as shown by 202. The fault, however, is not corrected and remains when the breaker is closed. The circuit breaker is then closed into this overload condition, as indicated generally by 204 (which shows the corresponding position of sensing switch 70). Internal trip unit power builds as the circuit breaker's main contacts arc, as shown generally at 220. Control circuit 20 samples the status of the sensing switch 70 as the trip unit power builds, before the circuit breaker is closed, and enables instantaneous trip protection, as indicated generally by 230. The circuit breaker closes at 206 and then re-opens at 208 pursuant to instantaneous protection provided by the instantaneous trip circuit 18. The time delay indicated by 232 is caused, for example, by the power-up of the trip units, control circuit 20 and actuator 24.

Optional jumper 95 shown in FIG. 3 allows the control circuit 20 to be installed, for example, as original equipment in many different types of circuit breakers, even those in which instantaneous protection is desired on a full time basis. This increases the flexibility and adaptability of the circuit breakers. More particularly, if jumper 95 is used, it supplies the supply voltage to the inputs of buffer 96, and the control circuit 20 will continuously enable instantaneous protection. Therefore, the circuit breaker will have instantaneous protection on a full-time basis in addition to any other trip protection characteristics or protective devices it may have. If jumper 95 is not used, the control circuit 20 implements instantaneous protection on a conditional and temporary basis subject to the position of control sensing switch 70, as described in detail above.

Control circuit 20 and position sensing switch 26 are also configured such that if the switch 26 is missing or removed, transistor 78 is automatically biased off, which causes the control circuit 20 to disable instantaneous trip protection. The control circuit 20 can therefore tell the difference between an open switch 26 and a missing switch 26.

Although the preferred embodiment of the present invention has been described and illustrated above, those skilled in the art will appreciate that various changes and modifications to the present invention do not depart from the spirit of the invention. Accordingly, the scope of the present invention is limited only by the scope of the following appended claims.

What is claimed is:

1. A circuit interrupter for coupling to a distribution line for interrupting the current in said line during current overload conditions, said circuit interrupter having a first input for receiving a signal representative of the current in said line, comprising:

a breaker having a first position wherein it interrupts the current path in said line and a second position wherein it completes the current path in said line;

an actuator that moves said breaker from said second position to said first position;

a first overload detector coupled to said actuator and coupled to said first input, and causing said actuator to move said breaker from said second position to said first position when said signal representative of the current exceeds a first value for a first duration;

a second overload detector coupled to said actuator and coupled to said first input, said second overload detector being operational for a second duration beginning substantially when said breaker is moved from said first position to said second position; and, when operational, said second overload detector causes said actuator to move said breaker from said second position to said first position when said signal representative of the current exceed a second value.

2. The circuit interrupter of claim 1 wherein said second duration is less than 100 milliseconds.

3. The circuit interrupter of claim 1 wherein said second duration is less than 50 milliseconds.

4. The circuit interrupter of claim 1 wherein:

said circuit interrupter has a second input for receiving electrical power from said line, said second overload detector is electronic and is powered by said electrical power, said second overload detector receiving interim power from said second input caused by arcing between said breaker and line when said breaker moves from said first to second position, said interim power sufficient to operate said second overload detector when said breaker reaches said second position.

5. The circuit interrupter of claim 1 further comprising:

a breaker sensor that indicates whether the breaker is in the first or second position;

said breaker sensor coupled to said second overload detector;

said second overload detector having a counter that measures said second duration;

said second overload detector starting said counter when said breaker sensor indicates a transition of said breaker from said first position to said second position.

6. The circuit interrupter of claim 5 wherein said second duration is between 20 and 70 milliseconds.

7. The circuit interrupter of claim 5 wherein said counter comprises an RC timing circuit.

8. The circuit interrupter of claim 7 wherein said second duration is between 20 and 70 milliseconds.

9. A circuit interrupter for coupling to a distribution line, and having a current monitor that measures current in the line, and having a first position wherein it interrupts the current in the line in response to a current overload in the line, and a second position wherein it completes the current path of the line, comprising:

a first current overload detector coupled to said current monitor that issues a first overload signal indicative of a current overload in the line when said monitored current exceeds a first value for a first period of time;

a second current overload detector coupled to said current monitor that issues a second overload signal indicative of a current overload in the line substantially instantaneously when said monitored current exceeds a second value; and a controller that enables and disables said second current overload detector;

said controller enabling said second overload detector for a second period of time after the position of said circuit interrupter changes from said first position to said second position.

10. The circuit interrupter of claim 9 wherein the second period of time is between 20 and 70 milliseconds.

11. The circuit interrupter of claim 9 wherein the second period of time is between 30 and 60 milliseconds.

12. The circuit interrupter of claim 9 further comprising:

movable contacts that open when the circuit interrupter is in the first position to interrupt the current in the line and close when the circuit interrupter is in the second position to allow the current to flow in the line; and said second period of time beginning substantially when said contacts close.

13. The circuit interrupter of claim 12 further comprising:

an actuator that opens the movable contacts to interrupt the current in the line;

the actuator coupled to said first and second overload detectors for responding to said first and second overload signals by opening said contacts to interrupt said circuit.

14. The circuit interrupter of claim 13 wherein said second period of time is between about 20 and 70 milliseconds.

15. The circuit interrupter of claim 9 wherein said second overload detector is electronic and receives electrical power from said distribution line, and wherein said second overload detector receives sufficient power to operate by the time said contacts are moved from said open position to said closed position due to arcing between the contacts and line as the contacts approach the closed position.

16. A circuit breaker for coupling to an electrical circuit, comprising:

a monitor that measures current in the circuit;

contacts movable between an open position and a closed position wherein said electrical circuit is completed when said contacts are in said closed position, and said circuit is interrupted when said contacts are in said open position, an actuator that moves said contacts from said closed position to said open position;

a first overload detector coupled to said monitor and to said actuator that issues a signal to said actuator to move said contacts from said closed position to said open position when said current exceeds a first predetermined value for a first predetermined period of time;

a second overload detector operational for a second predetermined period of time which begins substantially when said contacts are moved from said open position to said closed position; and said second overload detector coupled to said monitor and to said actuator that issues a signal to said actuator to move said contacts from said closed position to said open position substantially instantaneously when said current exceeds a second predetermined value.

* * * * *